(12) United States Patent
Hedtke (10) Patent No.: US 8,276,458 B2
(45) Date of Patent: Oct. 2, 2012

(54) TRANSMITTER OUTPUT WITH SCALABLE RANGEABILITY

(75) Inventor: Robert C. Hedtke, Young America, MN (US)

(73) Assignee: Rosemount Inc., Eden Prairie, MN (US)

( * ) Notice: Subject to any disclaimer, the term of this patent is extended or adjusted under 35 U.S.C. 154(b) by 325 days.

(21) Appl. No.: 12/834,393

(22) Filed: Jul. 12, 2010

(65) Prior Publication Data

US 2012/0006120 A1    Jan. 12, 2012

(51) Int. Cl.
*G01L 9/00* (2006.01)

(52) U.S. Cl. .......................................................... 73/717

(58) Field of Classification Search .................... 73/717, 73/736, 754, 756
See application file for complete search history.

(56) References Cited

U.S. PATENT DOCUMENTS

| | | |
|---|---|---|
| 4,748,852 A | 6/1988 | Frick |
| 4,949,581 A | 8/1990 | Rud, Jr. |
| 5,253,511 A | 10/1993 | Jaramillo et al. |
| 5,495,769 A | 3/1996 | Broden et al. |
| 6,047,244 A | 4/2000 | Rud, Jr. |
| 6,295,875 B1 | 10/2001 | Frick et al. |
| 6,370,448 B1 | 4/2002 | Eryurek |
| 6,484,585 B1 | 11/2002 | Sittler et al. |
| 6,508,129 B1 | 1/2003 | Sittler |
| 6,568,279 B2 | 5/2003 | Behm et al. |
| 6,898,980 B2 | 5/2005 | Behm et al. |
| 7,171,857 B2 * | 2/2007 | Barron .......................... 73/719 |
| 7,185,545 B2 * | 3/2007 | Wright, III .................... 73/799 |
| 7,321,846 B1 | 1/2008 | Huisenga et al. |
| 7,467,555 B2 | 12/2008 | Schulte et al. |
| 7,550,351 B2 * | 6/2009 | Yang et al. .................... 438/269 |
| 7,647,835 B2 * | 1/2010 | Speldrich ....................... 73/754 |
| 2005/0208908 A1 | 9/2005 | Karschnia et al. |

OTHER PUBLICATIONS

International Search Report and Written Opinion from International Application No. PCT/US2011/001211; filed Jul. 11, 2011.

* cited by examiner

*Primary Examiner* — Jewel V Thompson
(74) *Attorney, Agent, or Firm* — Kinney & Lange, P.A.

(57) ABSTRACT

An industrial process transmitter includes a sensing system and transmitter electronics. The sensing system senses a process variable over a range. The transmitter electronics is connected to the sensing system and produces a scaled analog communication signal to communicate the process variable over an analog loop. The range is disproportionately distributed over the scale by the transmitter electronics.

20 Claims, 7 Drawing Sheets

TRANSMITTER OUTPUT WITH SCALABLE RANGEABILITY

CROSS-REFERENCE TO RELATED APPLICATION(S)

The present application is related to the following copending application filed on the same day as this application: "DIFFERENTIAL PRESSURE TRANSMITTER WITH COMPLIMENTARY DUAL ABSOLUTE PRESSURE SENSORS" by inventors D. Broden, R. Hedtke A. Klosinski and F. Sittler, having Ser. No. 12/834,245

BACKGROUND

The present invention relates to output of industrial process transmitters. More particularly, the present invention relates to transmitters that communicate using analog signals.

Process instruments are used to monitor process variables, such as pressure, temperature, flow and level, of process fluids used in industrial processes. For example, process transmitters are typically employed in industrial manufacturing facilities at multiple locations to monitor a variety of process variables along various production lines. Process transmitters include sensors that produce an electrical signal in response to physical changes in the process. For example, pressure transmitters include pressure transducers that produce an electrical signal as a function of the pressure of a process fluid, such as in water lines, chemical tanks or the like. Process transmitters also typically include transmitter electronics for receiving and processing the sensor signal so that the transmitter and process can be monitored remotely. Remotely monitored transmitters include electronics that transmit an electrical output over a control loop or network to a central monitoring location such as a control room. Configured as such, the process can be regulated from the control room by including automated switches, valves, pumps and other similar components in the process control system and the control loop.

Advancements in transmitter technology have rapidly increased the amount of information that can be produced by a transmitter. In particular, transmitters can be equipped with multiple sensors to measure multiple process variable inputs or a wider range of a single process variable. For example, transmitters can be provided with multiple pressure sensors as described in U.S. Pat. No. 5,495,769 to Broden et al., U.S. Pat. No. 6,047,244 to Rud, Jr. and U.S. Pat. No. 7,467,555 to Schulte et al., all of which are assigned to Rosemount Inc., Eden Prairie, Minn. Similarly, communications technology has advanced to allow more information and data to be communicated between the transmitter and the control room. For example, digital network protocols, such as HART or FOUNDATION ™Fieldbus, allow data from multiple sensors and multiple transmitters to be transmitted over a common digital communication bus.

Many existing control systems are configured to operate using analog control loops. Many users like the advantages of digital communications, but cannot justify the cost of upgrading equipment and training employees. Typical analog control loops transmit an output representing the measured process variable in the form of a 4 mA to 20 mA signal between the transmitter and control room. For transmitters having a wide ranging sensor or dual range sensors, such as described in the previously mentioned patent to Rud, Jr., the entire measurement range of the sensor or sensors is distributed proportionally along the analog signal. This reduces the resolution of transmitter output along the whole signal, making less information available in particular areas of interest within the sensor range. There is, therefore, a need to increase the compatibility of advanced transmitters with analog control loops. In particular, there is a need for obtaining more information from transmitters operating on analog control loops.

SUMMARY

The present invention is directed to analog output signals representing measured process variables produced by industrial process transmitters. An industrial process transmitter includes a sensing system and transmitter electronics. The sensing system senses a process variable over a range. The transmitter electronics is connected to the sensing system and produces a scaled analog communication signal. The range is disproportionately distributed over the scale by the transmitter electronics that communicates the process variable over an analog loop.

DETAILED DESCRIPTION

Figure 1:
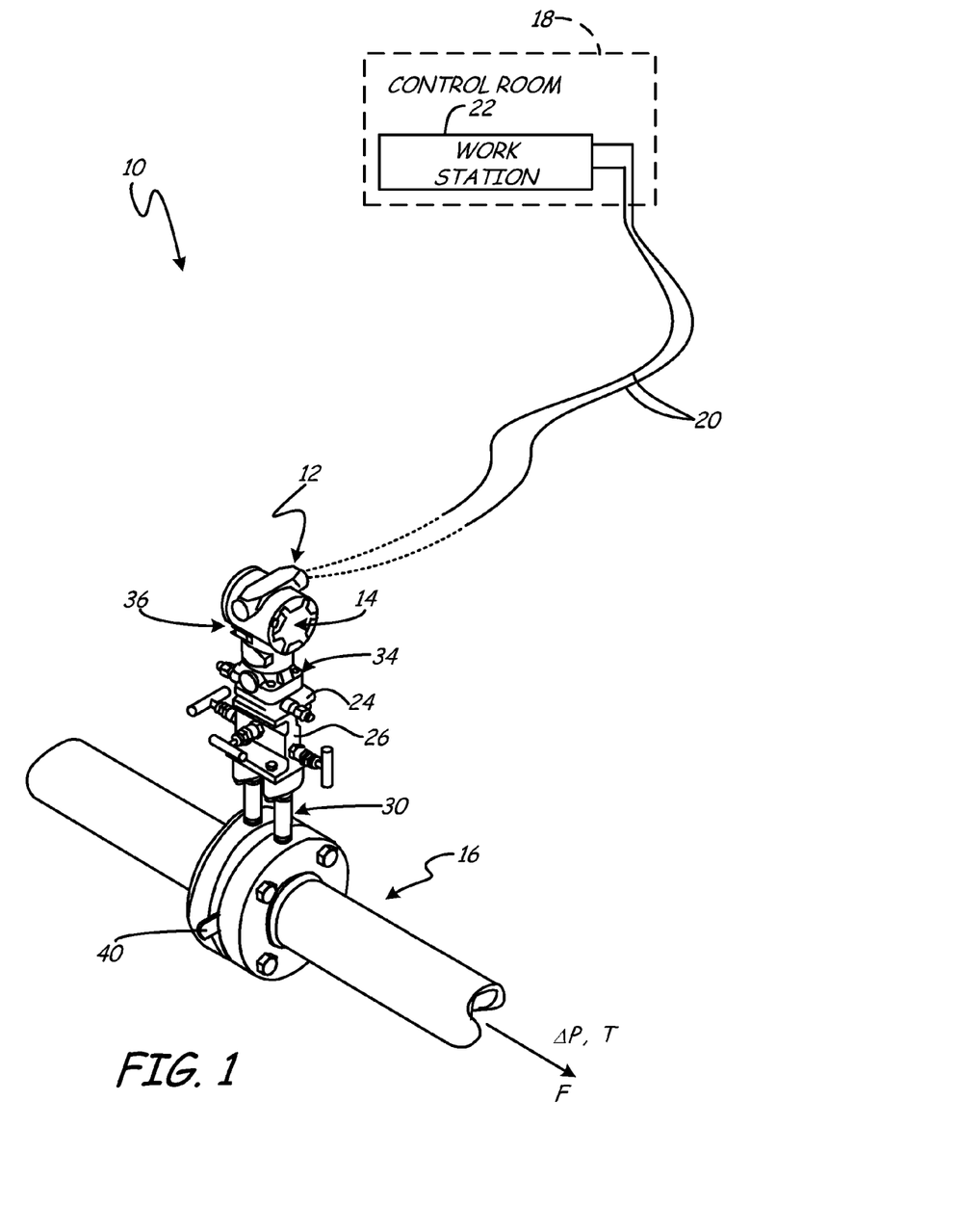
FIG. 1 shows a process control system having a process transmitter connected to a process fluid source and a control room.

FIG. 1 shows process control system 10 of the present invention having process transmitter 12 that uses a communications protocol having scalable rangeability. Process control system 10 includes process transmitter 12, instrument display 14, piping 16 and control room 18. Control room 18, which is connected to transmitter 12 with control loop 20, includes work station 22. Work station 22 includes various components for interacting with transmitter 12 such as a power supply and communications interfaces. Process transmitter 12 is connected to a process source, such as piping 16, to generate signals relating to process variables of process fluid F, such as differential pressure ΔP and temperature T, using various process variable sensors. Process transmitter 12 can include multiple pressure sensors that provide pressure readings over different ranges. Likewise, process transmitter 12 can include a temperature sensor that provides temperature readings over a wide range. Transmitter 12 is calibrated for the output range of each sensor. Using scalable rangeability techniques of the present invention, transmitter 12 is able to transmit data having varying levels of resolution over an analog control loop for a process variable.

According to one embodiment, process transmitter 12 is coupled to piping 16, through which process fluid F flows, using process flange 24, manifold 26 and impulse piping 30. Process transmitter 12 includes sensor module 34 and transmitter electronics module 36. Process flange 24 connects transmitter 12 to manifold 26, which allows transmitter 12 to be isolated from process fluid F for calibration, testing, and maintenance, etc. Differential pressure ΔP is produced within the flow of process fluid F by primary element 40, which in the embodiment shown comprises an orifice plate. The orifice plate includes a bore having a diameter smaller than that of piping 16 to produce a flow restriction. Relatively higher and lower pressures on either side of orifice plate 40 are communicated through impulse piping 30, manifold 26 and flange 24 to sensor module 34. Sensor module 34 includes a differential pressure sensor, as well as a pair of absolute pressure sensors, for sensing differential pressure ΔP. Module 34 also includes a temperature sensor for sensing temperature T. Sensor module 34 generates electrical signals based on output from the sensors, and transmits the signals to transmitter electronics module 36.

Information can be obtained locally from transmitter 12 through use of display 14. Display 14 indicates information relating to differential pressure ΔP and temperature T at different resolutions. Information can also be obtained remotely from transmitter 12 at control room 18. Transmitter 12 may be capable of communicating over both digital and analog control systems to transmit data to control room 18 at various resolution levels. Transmitter 12 is provided with integral electronics that enable electronics module 36 to communicate digitally with control room 18 over a wireless or wired network. In various embodiments, process transmitter 12 is capable of communicating over a HART®, WirelessHART® or FOUNDATION™Fieldbus network protocol. Such digital communications protocols allow data for multiple process variables to be transmitted from transmitter 12 to control room 18 at full resolution.

Workstation 22 also enables control room 18 to receive data from and transmit data to process transmitter 12 utilizing analog control loop 20. In one embodiment, process transmitter 12 is a two-wire transmitter that operates on a 4 mA to 20 mA loop. Work station 22 includes components, such as a digital processor, video display and keyboard, for operating transmitter 12 and manipulating the control loop signal relating to ΔP and T. Using scalable rangeability, transmitter electronics module 36 includes circuitry programmed to disproportionately distribute the range of process sensor data over the scale of the analog communication signal to achieve variable data resolution.

Figure 2:
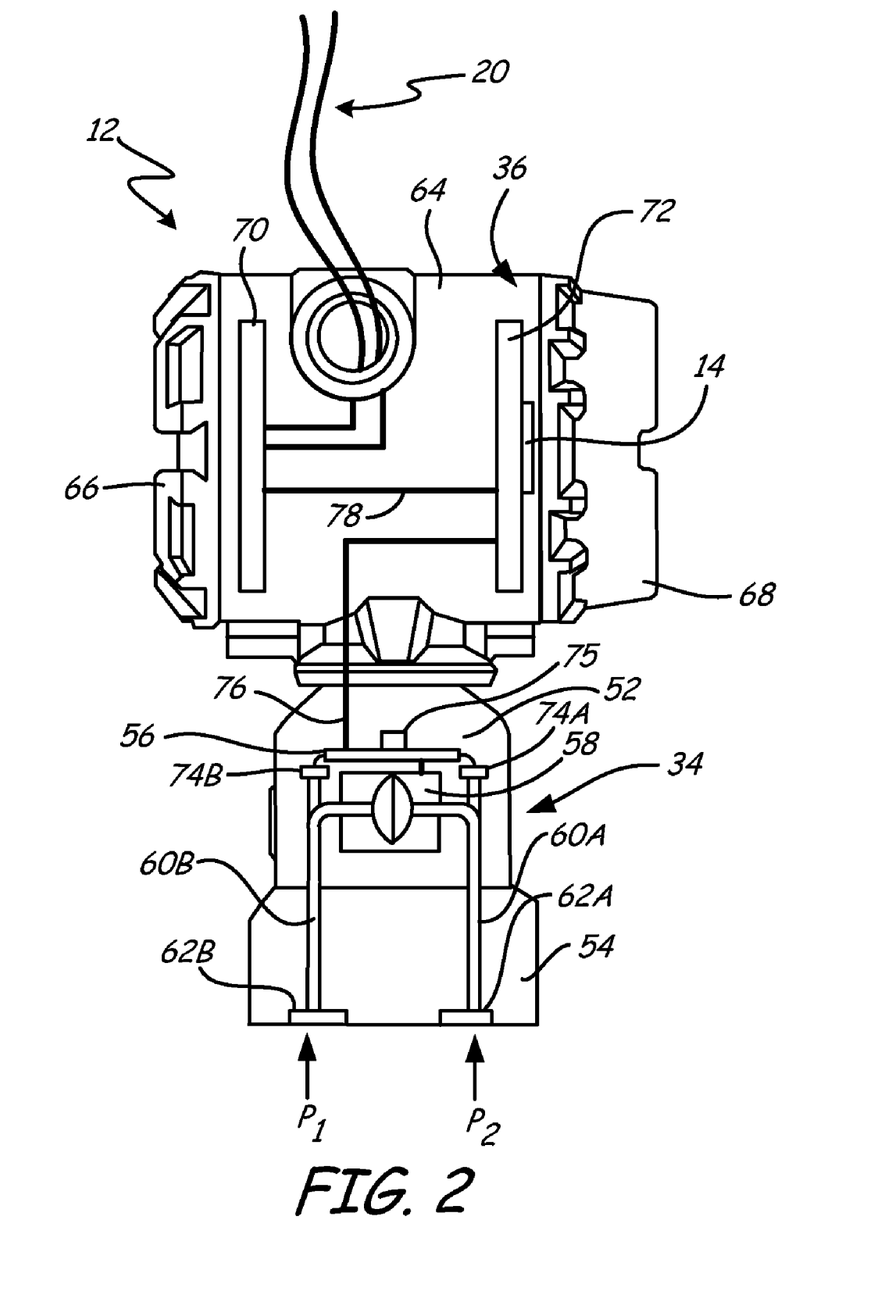
FIG. 2 is a schematic side view of the process transmitter of FIG. 1 showing transmitter electronics that operate over a communications protocol using scalable rangeability.

FIG. 2 schematically shows one embodiment of pressure transmitter 12, sensor module 34 and transmitter electronics module 36. Sensor module 34 includes housing 52 and base 54, in which are disposed sensor board 56, differential pressure sensor 58, isolation tubes 60A and 60B and isolation diaphragms 62A and 62B. Transmitter electronics module 36 includes housing 64, cover 66, display cover 68, output interface 70 and transmitter circuitry 72. Sensor module 34 also includes absolute pressure sensors 74A and 74B and temperature sensor 75. Pressures $P_1$ and $P_2$ are produced on either side of primary element 40 in piping 16. Subtracting $P_1$ from $P_2$ determines ΔP (FIG. 1).

Base 54 of sensor module 34 is connected to flange 24 (FIG. 1), such as with threaded fasteners. Sensor board 56 and sensor 58 are mounted within housing 52 of sensor module 34. Housing 52 of sensor module 34 connects to housing 64 of electronics module 36 through, for example, a threaded connection. Similarly, covers 66 and 68 are connected to housing 64 through threaded connections that form flame-quenching seals, as are known in the art, to prevent escape of flames from within housing 64. Thus, covers 66 and 68 are removable from housing 64. Output interface 70 and transmitter circuitry 72 are mounted to housing 64 within transmitter electronics module 36.

In the embodiment shown, sensor 58 comprises a capacitance-based differential pressure cell having a sensing diaphragm disposed between a pair of electrode plates. In one embodiment, sensor 58 comprises a metal-diaphragm type sensor as is described in U.S. Pat. No. 6,295,875 to Frick et al., which is assigned to Rosemount Inc., Eden Prairie, Minn. Sensor 58 is connected to base 54 with isolation tubes 60A and 60B, in which is disposed a hydraulic fill fluid. Isolation diaphragms 62A and 62B separate the fill fluid within isolation tubes 60A and 60B from pressures $P_1$ and $P_2$ of process fluid F. Physical changes in pressures $P_1$ and $P_2$ of process fluid F are sensed as differential pressure ΔP by sensor 58 through isolation diaphragms 62A and 62B within base 54 and the hydraulic fill fluid within isolation tubes 60A and 60B.

In the described embodiment, absolute pressure sensors 74A and 74B comprise capacitance-based absolute pressure sensors. In one embodiment, sensors 74A and 74B comprise capacitive pressure sensors as are described in U.S. Pat. No. 6,484,585 to Sittler et al. and the related series of applications, all of which are assigned to Rosemount Inc., Eden Prairie, Minn. Such sensors include technology that uses brittle sensing materials having high compression strength, such as sapphire. Sensors 74A and 74B sense pressures $P_1$ and $P_2$ of the fill fluid in isolation tubes 60A and 60B, respectively. The pressures sensed by each of pressure sensors 74A and 74B can be compared to each other to produce a signal representative of differential pressure ΔP that can be used in place of, or for comparison to, differential pressure ΔP sensed by sensor 58.

Sensors 58, 74A and 74B together comprise a sensor system that is comprised of a differential sensor apparatus having a single sensor device, and an absolute sensor apparatus having multiple sensor devices. However, in other embodiments, the sensor system may comprise only a single sensor device as discussed below. Differential pressure sensor 58 and absolute pressure sensors 74A and 74B are in electronic communication with sensor board 56. Sensor board 56 is in electronic communication with transmitter circuitry 72 through sensor cable 76. Transmitter circuitry 72 is in electronic communication with output interface 70 through electronics cable 78. Output interface 70 connects transmitter 12 to wiring of control loop 20. As is described in greater detail with reference to FIG. 4, transmitter circuitry 72 manipulates the output signals from each of sensors 58 and 74A and 74B to command output interface 70 to produce an analog output signal compatible with analog control loop 20. In other embodiments of the invention, the performance of the functions of transmitter circuitry 72, sensor board 56 and output interface 70 are distributed differently to accomplish the same result.

Sensor 58 accurately measures small differential pressures. Sensors 74A and 74B accurately measure absolute pressures. Sensor 58 directly measures the difference between pressures $P_1$ and $P_2$. Sensors 74A and 74B directly measure pressures $P_1$ and $P_2$, respectively. The difference between sensors 74A and 74B is used to determine large differential pressures. Sensors 58, 74A and 74B can thus be used in a wide variety of scenarios to sense pressures and differential pressures.

In one embodiment, differential pressure sensor 58 has a sensor range from zero to 9 pounds per square inch (psi) (~62.1 kPa [kilo-Pascals]), and pressure sensors 74A and 74B have sensor ranges from zero to 5,000 psi (~34.5 MPa [Mega-Pascals]). Thus, for example, sensor 58 is functional for differential pressures ($P_1$-$P_2$) between 0 and 9 psi (~62.1 kPa), regardless of line pressure. For example, if $P_1$ is 9 psi (~62.1 kPa) and $P_2$ is zero, or $P_1$ is 1,009 psi (6.96 MPa) and $P_2$ is 1,000 psi (~6.89 MPa), both result in a 9 psi (~62.1 kPa) differential pressure. Absolute pressure sensors 74A and 74B are functional for any pressures less than 5,000 psi (~34.5 MPa). Sensors 74A and 74B measure pressures $P_1$ and $P_2$ from which differential pressure ($P_1$-$P_2$) can be calculated.

System 10 has the potential for producing very high pressure differentials (ΔP) within piping 16 during operation. Within a normal range, flow conditions within piping 16 produce only small pressure differentials, for example 0 to 9 psi (~62.1 kPa). However, the process of piping 16 sometimes exceeds the normal range and goes into an extended range where flow conditions within piping 16 produce larger pressure differentials, for example 9 psi (~62.1 kPa) to 36 psi (~248.2 kPa). Due to unforeseen non-flow-related circumstances, sometimes the process pressures exceed the extended range pressures and go into an abnormal range where even larger pressure differentials occur within piping 16, for example 36 psi (~248.2 kPa) to 1,000 psi (~6.89 MPa). Thus, to monitor the process during the normal course of operation, an operator only needs to monitor for differentials in a small area of interest as compared to the entire range of the possible differential pressures that might occur. To monitor the process outside of the normal course of operation, it becomes necessary to look beyond pressures differentials in the small area of interest of the normal range and into the extended and abnormal ranges.

In the extended range, for example, high flow rates produce unusually large pressure differentials, typically not exceeding about four times the differential pressures that occur in the normal range. For the described embodiment, the extended range produces pressure differential that extend from about 9 psi (~62.1 kPa) to about 36 psi (~248.2 kPa). Extended range pressures occur infrequently such as during plant startup so they are outside the typical area of interest needed for day-to-day operation of the process. In the abnormal range anomalous conditions in the process, such as a clogged impulse line or an inadvertently closed valve of manifold 26 (FIG. 1), can produce a very large differential pressure not ordinarily encountered and is thus way outside the typical area of interest. For the described embodiment, the abnormal range extends from about 36 psi (~248.2 kPa) to about 1,000 psi (~6.89 MPa).

Differential pressure sensor 58 provides an accurate measurement of a small differential pressure range. Thus, sensor 58 is typically configured to sense differential pressures in the normal range—the area of interest of the process. Sensor 58, however, is not usable when the sensed differential pressure exceeds the pressure sensor range. In this particular example, when the difference between pressures $P_1$ and $P_2$ exceeds 9 psi (~62.1 kPa), the output of pressure sensor 58 becomes saturated. Thus, an operator of the process that is monitoring the output of transmitter 12 would be unable to detect an extended range process condition by the output of differential sensor 58 alone. Absolute pressure sensors 74A and 74B are very stable and provide transmitter 12 the ability to sense conditions outside of the normal range. Sensors 74A and 74B are configured to sense pressures $P_1$ and $P_2$ throughout the entirety of the normal range, extended range and abnormal range. Sensors 74A and 74B provide transmitter 12 with the ability to sense out-of-process conditions by using the sensed pressures $P_1$ and $P_2$ to calculate a differential pressure ΔP. As such, the high differential pressure saturation point of transmitter 12 is extended or eliminated.

As described with reference to FIGS. 3A-3C, transmitter circuitry 72 performs scalable rangeability techniques to distribute the scale of the 4 mA to 20 mA analog signal over pressures produced in the normal range, the extended range and the abnormal range for communication over control loop 20. The specific points at which the scale is shifted between the normal range, the extended range and the abnormal range pressures varies, depending on the resolution needed for each range.

Figure 3A:
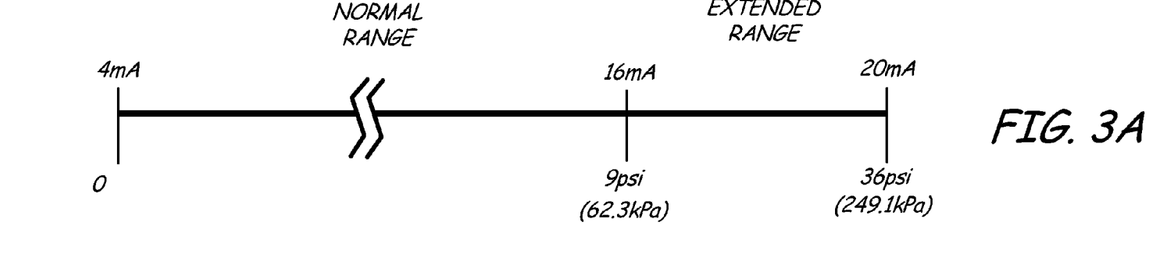
FIG. 3A shows a chart in which a process condition normal range and an extended range are disproportionately distributed over an analog communication signal scale.

FIG. 3A shows a chart in which the normal range pressures and the extended range pressures are disproportionately distributed over an analog communication signal scale. In this embodiment, transmitter 12 is configured to give a high degree of resolution to the normal range and a lower degree of resolution to the extended range. This is desirable when there is interest in obtaining detailed information about the normal range, and at least an indication of what is going on in the extended range, but there is no interest in the abnormal range.

According to this embodiment, the normal range differential pressures ΔP of 0 to 9 psi (~62.1 kPa) are distributed over the first twelve milliamps (4-16 mA) of the output signal. Thus, resolution for the normal range is approximately 0.75 psi/mA (~5.2 kPa/mA). The extended range differential pressures ΔP of 9 psi (~62.1 kPa) to 36 psi (~248.2 kPa) are distributed over the last four milliamps (16-20 mA). Thus, resolution for the extended range is approximately 6.75 psi/mA (~46.5 kPa/mA). Transmitter circuitry 72 coordinates production of a 4 mA to 16 mA signal reflecting the normal range of 0 to 9 psi (~62.1 kPa), and a 16 mA to 20 mA signal reflecting the extended range of 9 psi (~62.1 kPa) to 36 psi (~248.2 kPa). A linearly distributed signal is produced for each of the normal range and the extended range.

Figure 3B:
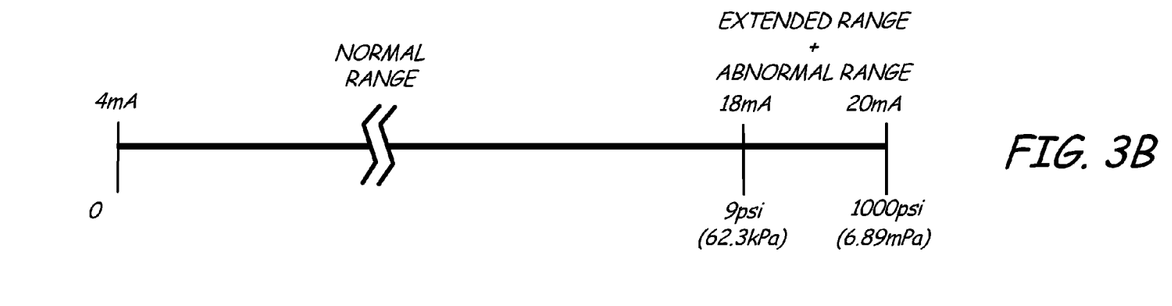
FIG. 3B shows a chart in which a process condition normal range and an abnormal range are disproportionately distributed over an analog communication signal scale.

FIG. 3B shows a chart in which the normal range pressures and the abnormal range pressures, including the extended range pressures, are disproportionately distributed over an analog communication signal scale. In this embodiment, transmitter 12 is configured to give a high degree of resolution to the normal range and a lower degree of resolution to the abnormal range. This is desirable when there is interest in obtaining detailed information about the normal range, and at least an indication of what is going on in the abnormal range, including the extended range.

The normal range differential pressures ΔP of 0 to 9 psi (~62.1 kPa) are distributed over the first fourteen milliamps (4-18 mA) of the output signal. Thus, resolution for the normal range is approximately 0.64 psi/mA (~4.4 kPa/mA). The extended and abnormal range differential pressures ΔP of 9 psi (~62.1 kPa) to 1,000 psi (~6.89 MPa) are distributed over the last two milliamps (18-20 mA). Thus, resolution for this range is approximately 495.5 psi/mA (~3.4 MPa/mA). Transmitter circuitry 72 coordinates production of a 4 mA to 18 mA signal reflecting the normal range of 0 to 9 psi (~62.1 kPa), and an 18 mA to 20 mA signal reflecting the combined extended and abnormal ranges of 9 psi (~62.1 kPa) to 1,000 psi (~6.89 MPa). A linearly distributed signal is produced for both the normal range, and the extended and abnormal range.

Figure 3C:
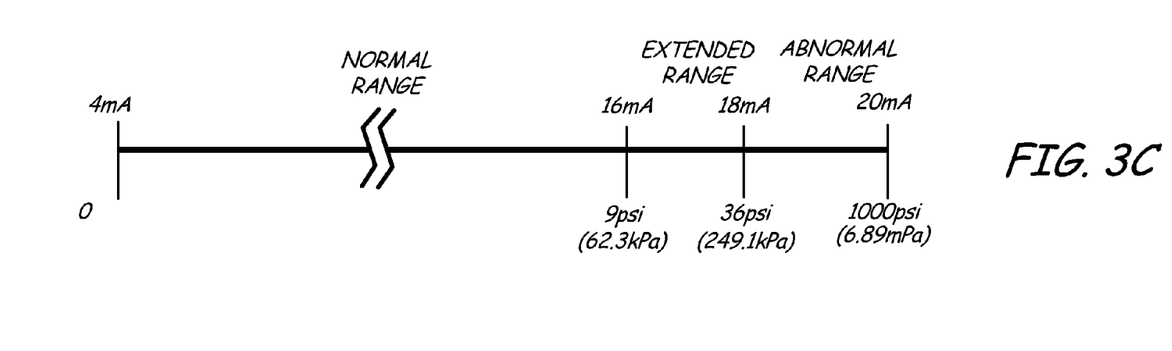
FIG. 3C shows a chart in which a process condition normal range, an extended range and an abnormal range are disproportionately distributed over an analog communication signal scale.

FIG. 3C shows a chart in which the normal range, extended range and abnormal range pressures are disproportionately distributed over an analog communication signal scale. In this embodiment, transmitter 12 is configured to give a high degree of resolution to the normal range, a lower degree of resolution to the extended range, and an even lower degree of resolution to the abnormal range. This is desirable when there is interest in obtaining detailed information about the normal range, some level of detail about the extended range, and at least an indication of what is going on in the abnormal range.

The normal range differential pressures ΔP of 0 to 9 psi (~62.1 kPa) are distributed over the first twelve milliamps (4-16 mA) of the output signal. Thus, resolution for the normal range is approximately 0.75 psi/mA (~5.2 kPa/mA). The extended range differential pressures ΔP of 9 psi (~62.1 kPa) to 36 psi (~248.2 kPa) are distributed over the next two milliamps (16-18 mA). Thus, resolution for the extended range is approximately 13.5 psi/mA (~93.1 kPa/mA). The abnormal range differential pressures ΔP of 36 psi (~248.2 kPa) to 1,000 psi (~6.89 MPa) are distributed over the last two milliamps (18-20 mA). Thus, resolution for the abnormal range is approximately 482 psi/mA (~3.32 MPa/mA). Transmitter circuitry 72 coordinates production of a 4 mA to 16 mA signal reflecting the normal range of 0 to 9 psi (~62.1 kPa), a 16 mA to 18 mA signal reflecting the extended range of 9 psi (~62.1 kPa) to 36 psi (~248.2 kPa), and a 18 mA to 20 mA signal reflecting the abnormal range of 36 psi (~248.2 kPa) to 1,000 psi (~6.89 MPa). A linearly distributed signal is produced for each of the normal range, extended range, and abnormal range.

Different analog signals having different resolutions can be obtained, depending on the specific needs of the process control system. The analog signal can be divided into different resolutions for each of the normal, extended and abnormal ranges. As demonstrated above, greater resolution levels can be used in the normal range so that smaller changes in the process variable produce a larger change in the output signal, as compared to the extended range and abnormal range. Thus, small changes in the process are easily perceived by changes in the output signal. Also, each range could have multiple resolutions. The inflection point between resolutions can occur at the upper range limit of a sensor, or within a range of a sensor. For example, the upper limit of the abnormal range can be set at any point within the upper limit of the pressure sensor having the highest range limit, while the sensor with the smallest range limit can be used for the normal range. Alternatively, a single sensor output can be broken into different resolutions for the normal, extended and abnormal range signals. The inflection points can be programmed to occur at a specified pressure that is sensed or a specified current that is used for the output signal. There is an unlimited number of choices in selecting where the inflection points begin and end, and in selecting which sensor signal is used to produce each range, depending on the capabilities of the sensors used. Transmitter circuitry 72 manipulates output interface 70 (FIG. 2) to produce an analog output signal having a different resolution for each differential pressures ΔP range and that is transmitted over control loop 20 to workstation 22. Circuitry 72 (FIG. 2) includes software programmed with scalable rangeability routines that present the output signal to control room 18 as a single output signal having a bi-linear, tri-linear or other relationship. The generation of analog signals for distribution to control room 18 coincident with the embodiment of FIG. 3C are discussed in further detail with respect to FIGS. 4 and 5.

Figure 4:
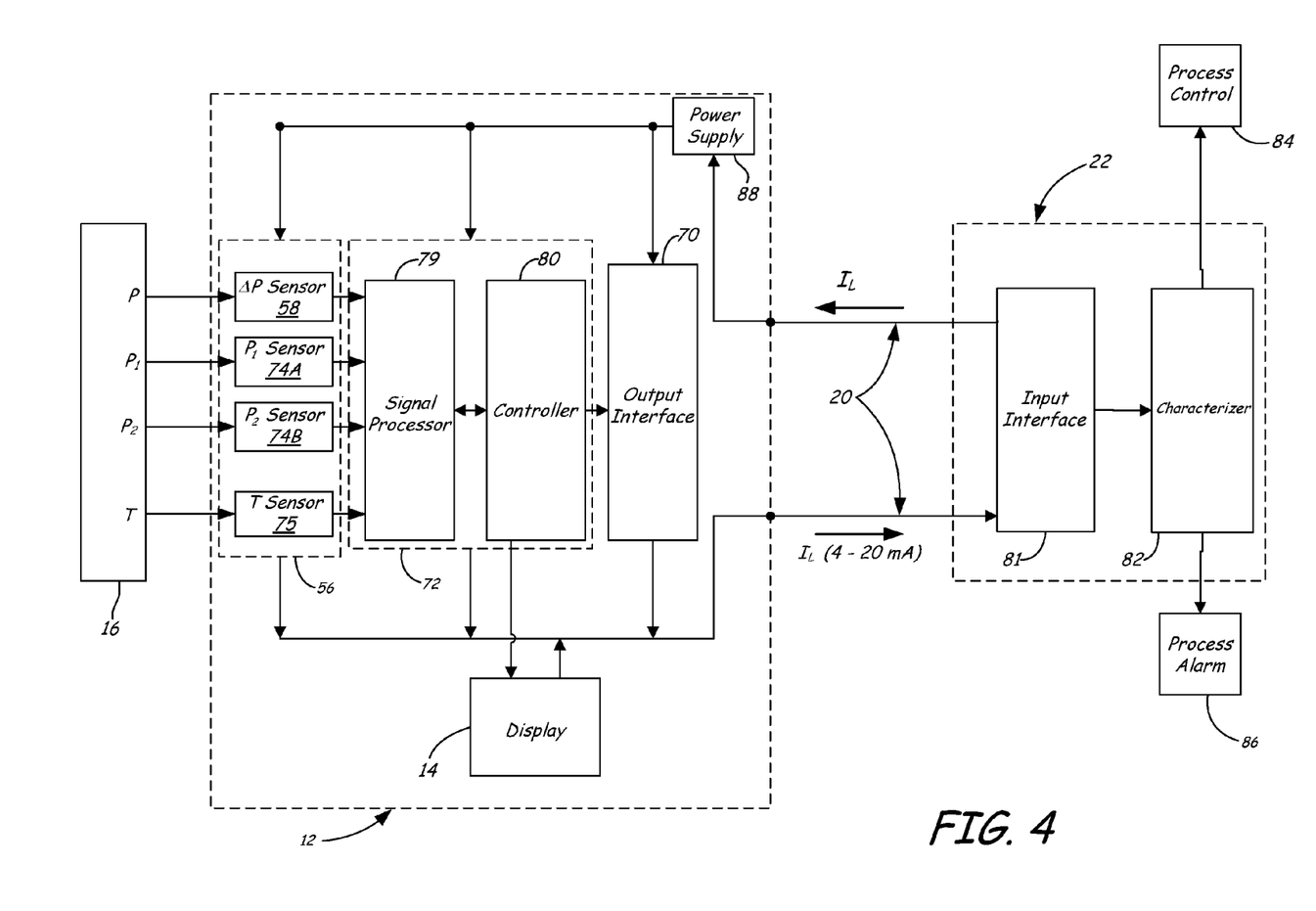
FIG. 4 is a block diagram showing the processing of a transmitter signal having scalable rangeability.

FIG. 4 is a block diagram showing how transmitter 12 generates a transmitter signal having scalable rangeability. Transmitter 12 is fluidly connected to piping 16 and electrically connected to workstation 22. Transmitter 12 includes display 14, differential pressure sensor 58, absolute pressure sensors 74A and 74B, sensor board 56, output interface 70 and transmitter circuitry 72, which includes signal processor 79 and controller 80. Differential pressure sensor 58 and absolute pressure sensors 74A and 74B are linked to a pressure source within piping 16, such as through a hydraulic fill fluid system, and sensor board 56 through appropriate electrical connections. Sensor board 56 is connected to transmitter electronics 72 with cable 76 (FIG. 2). Signal processor 79 and controller 80 are connected in series with output interface 70 through cable 78 (FIG. 2). Controller 80 is also coupled to local display 14. Output interface 70 is connected to workstation 22 of control room 18 through control loop 20. Workstation 22 includes input interface 81 and characterizer 82. Characterizer 82 provides control system outputs, such as process control 84 and process alarm 86.

Output interface 70 and input interface 81 complete the analog loop signal, loop current $I_L$, over control loop 20. Workstation 22 provides power to transmitter 12. Power supply 88 of transmitter 12 provides regulated power to the electronics of transmitter 12. Controller 80 maintains the appropriate loop current based on the pressure to analog current relationship. Circuitry 72 performs scalable rangeability techniques of the present invention. Thus, a 4 mA to 20 mA loop current $I_L$ is sent between transmitter 12 and input interface 81 of workstation 22, the magnitude of which is adjusted by controller 80 based on the differential pressure sensed by sensor 58 or sensors 74A and 74B.

According to this embodiment, pressure sensors 58, 74A and 74B sense pressure within piping 16 by changing their capacitance as pressures $P_1$ and $P_2$ change. Sensor 58 changes its capacitance as the difference between $P_1$ and $P_2$ changes between 0 and 9 psi (~62.1 kPa). Sensors 74A and 74B each change their capacitance as the pressures $P_1$ and $P_2$, respectively, change between 0 and 5,000 psi (~34.5 MPa). A first analog signal is produced representative of a sensed differential pressure from 0 to 9 psi (~62.1 kPa) from sensor 58. A second analog signal is produced representative of the calculated differential pressure $P_1$ minus $P_2$. Temperature sensor 75 is also situated on sensor board 56 and produces a temperature signal representative of the temperature of transmitter 12. The sensed temperature may be used to provide corrections to the differential pressure values derived by signal processor 79.

Signal processor 79 of transmitter electronics 72 obtains from sensor board 56 the analog sensor signals output by sensors 58, 74A and 74B. Signal processor 79 produces digitized sensor signals that are a function of the sensed capacitances. Signal processor 79 can also perform various functions, including analog-to-digital conversion, signal conditioning and filtering. Signal processor 79 is provided with capacitance-to-digital converters or analog-to-digital converters for sensors 58, 74A and 74B. In one embodiment, three converters are used, one for each of the sensors. In another embodiment, a single converter is used for all the sensors with the addition of a multiplexer. In yet another embodiment, two converters are used, one for sensor 58, and one that is shared by sensors 74A and 74B. In any embodiment, signal processor 79 produces digitized sensor signals that can be further processed.

The digitized sensor signals are transmitted to controller 80 of transmitter circuitry 72. Controller 80 comprises a microprocessor and includes various components such as memory.

Using input from sensor 75, controller 80 also compensates each of the digitized signals for temperature variations as is known in the art. The digitized sensor signals of signal processor 79 are converted by controller 80 into digital measured pressure values using, for example, look up tables or formulae stored in memory that are programmed with information relating to the process ranges, sensor ranges, sensor characteristics and the like. Controller 80 provides display control signals to display 14 to display indicia of the measured pressure value directly on display 14 at any desirable resolution. Thus, controller 80 is able to determine if the sensed pressure is within the normal, extended or abnormal range.

Controller 80 determines which digitized sensor signal to use to produce the measured pressure value and the loop current $I_L$ representing that measured pressure value that is transmitted over control loop 20 by output interface 70. Controller 80 can control signal processor 79 to obtain any or all of the digitized sensor signals. In one embodiment, controller 80 is programmed with a specified pressure cutoff level at which output from sensors 74A and 74B are used instead of output from sensor 58. For example, controller 80 is programmed with information indicating that sensor 58 can only sense differential pressures ΔP of 9 psi (~62.1 kPa) or less. Controller 80 is also programmed to compare the differential pressure ΔP determined from sensor 58 with a differential pressure ΔP calculated from signals from sensors 74A and 74B. If the calculated differential pressure is within the normal process operating range [below 9 psi (~62.1 kPa)], the differential pressure ΔP output from sensor 58 is used to produce the measured value transmitted as $I_L$. If the calculated differential pressure ΔP is outside of the normal process operating range such that sensor 58 will not function properly, output based on the calculated differential pressure ΔP from sensors 74A and 74B is transmitted.

Controller 80 can perform various transition or blending techniques when switching between sensor outputs at the cutoff level. In one embodiment, sensor output is merely switched at the cutoff level such that the sensor signal is 100% transitioned. In other embodiments, the output is blended at predetermined intervals before the cutoff level. For example, the cutoff level typically coincides with the upper sensor range limit of sensor 58 (~9 psi or ~62.1 kPa). In one embodiment of blending, 100% of the signal from sensor 58 and 0% of the signals from sensors 74A and 74B are used at 8.8 psi (~60.7 kPa). This linearly transitions until 0% of the signal from sensor 58 and 100% of the signals from sensors 74A and 74B are used at 9 psi (~62.1 kPa). In yet other embodiments, more advanced blending techniques can be used, such as are described in the previously mentioned U.S. Pat. No. 6,047,244 to Rud, Jr. Controller 80 includes software programmed to perform scalable rangeability calculations of the present invention to generate an analog control signal for transmission over control loop 20. More specifically, controller 80 determines the resolution at which the measured pressure values are distributed over the 4 mA to 20 mA loop current $I_L$. After determining the measured pressure, which sensor output to use and whether to use a straight or blended sensor output to obtain the measured pressure, controller 80 determines if the process is in the normal, extended or abnormal range. Controller 80 is provided with the distribution of the process range for the analog control signal, examples of which are shown in FIGS. 3A-3C. Controller 80 determines how much of the 4 mA to 20 mA scale should be allocated to the sensed pressure. For example, controller 80 determines that pressures sensed within the normal range will require a loop current $I_L$ of between 4 mA to 16 mA, as shown in FIG. 3C. For pressures sensed within the extended range, a loop current $I_L$ of between 16 mA to 18 mA is required; and for pressures sensed within the abnormal range, a loop current $I_L$ of between 18 mA to 20 mA is required, as shown in FIG. 3C.

Controller 80 then provides a command to produce the corresponding analog signal for loop current $I_L$. Output interface 70 transmits to input interface 81 of workstation 22 one output signal (loop current $I_L$) over the 4 mA to 20 mA range having inflection points at each scale change determined by the measured pressure. In one embodiment, controller 80 uses a digital-to-analog converter to convert the selected or generated digital pressure signal into an analog current.

Input interface 81 in workstation 22 receives the 4 mA to 20 mA signal from control loop 20. Input 81 converts the 4 mA to 20 mA analog signal generated by circuitry 72 into a signal representative of an engineering units scale. In the example of FIG. 3C, 16 mA is converted to 75% of the engineering units scale, 18 mA is converted to 87.5% of the engineering units scale, and 20 mA is converted to 100% of the engineering units scale. Input interface 81 provides the opposite function of output interface 70 and produces a digital signal that can be converted into a pressure by characterizer 82.

Characterizer 82 receives the engineering units scale number and converts the number into a pressure value. Characterizer 82 is provided with information relating to the scalable rangeability techniques used by transmitter circuitry 72 such that data transmitted on control loop 20 by transmitter 12 can be decoded and displayed in a useable format. For example, characterizer 82 includes look up tables or formulae corresponding to what differential pressure value ΔP should be interpreted from the received loop current $I_L$ as converted to an engineering unit by input interface 81. The functions of input interface 81 and characterizer 82 can be performed by a digital control system, such as workstation 22 as shown, or can be performed by a programmable logic controller (PLC) interface.

If the pressure value is within the normal operating range, a process control signal is generated for controlling system 10 at process control 84. For example, automated switches, valves, pumps and other similar components in process control system 10 can be actuated to control the process variable or process fluid. If the pressure value is outside the normal operating range and into the extended range, an indication is given at process alarm 86 alerting operators that system 10 should be diagnosed. For example, if the measured pressure is within the extended range, an audible or visual alarm can be provided at workstation 22 such that, if needed, corrective action can be taken.

Figure 5:
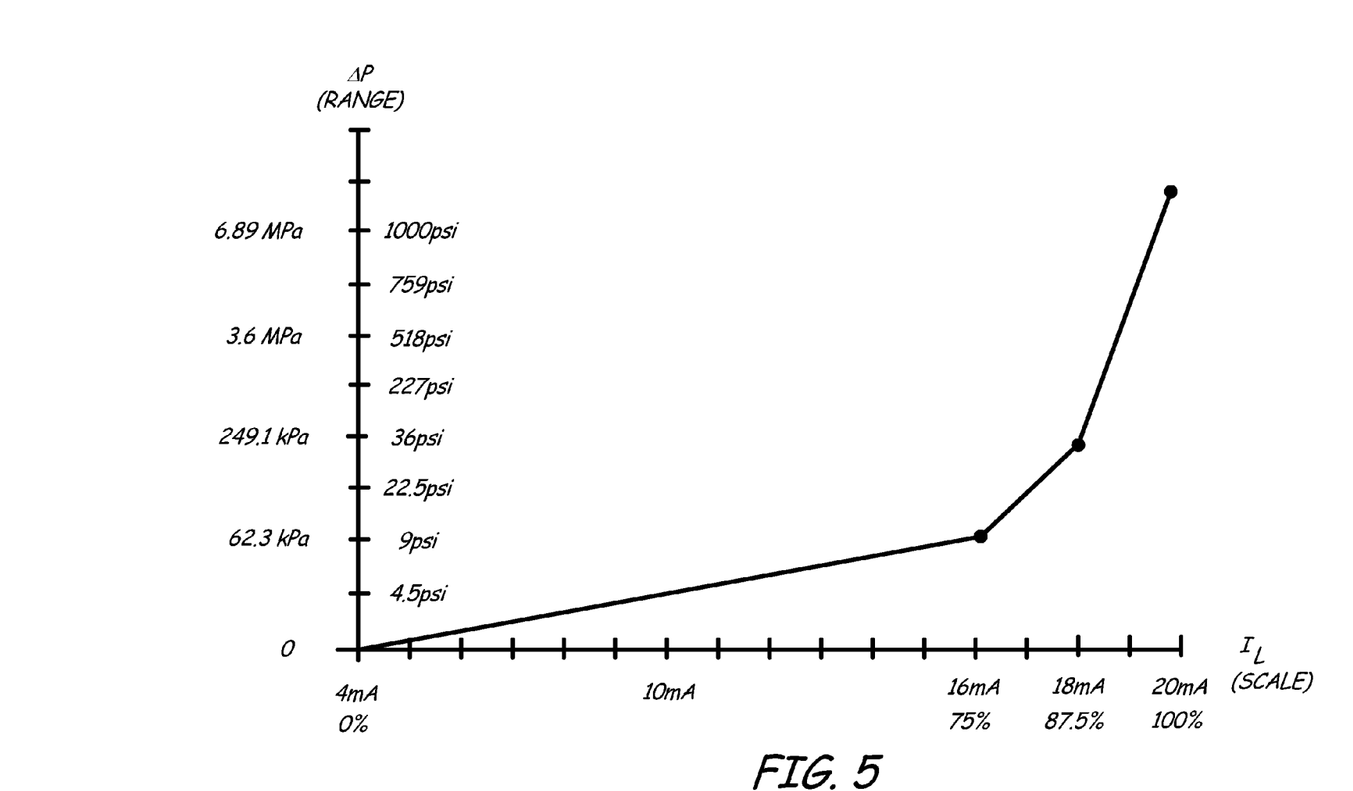
FIG. 5 shows a graph illustrating inflection points between tri-linearly distributed process condition ranges for a multi-sensor pressure transmitter.

According to this embodiment, FIG. 5 shows a graph illustrating another depiction of inflection points between linearly distributed process condition ranges for a multi-sensor pressure transmitter. Output from pressure sensors 58, 74A and 74B are broken into three process condition ranges: normal, extended and abnormal. The normal range is 0 to 9 psi (~62.1 kPa). The extended range is 9 psi (~62.1 kPa) to 36 psi (~248.2 kPa). The abnormal range is 36 psi (~248.2 kPa) to 1,000 psi (~6.89 MPa). For each range the resolution of the output signal is adjusted by transmitter 12. Thus, the loop current $I_L$ from transmitter 12 is decoded by characterizer 82 as a tri-linear output signal shown in FIG. 5. FIG. 5 provides an indication of the information stored by characterizer 82 that permits an incoming loop current $I_L$ (scaled to an engineering unit) to be converted to a pressure.

The normal range from 0 to 9 psi (~62.1 kPa) is applied to the first 75% of the loop current $I_L$ scale. The normal range is provided with the highest resolution such that small changes in the process can be observed. Thus, operators of control system 10 have greater insight into what is happening within the normal range so that the process can be precisely controlled. The extended range from 9 psi (~62.1 kPa) to 36 psi (~248.2 kPa) corresponds to the next 12.5% of the loop current $I_L$ scale. The extended range is provided with medium resolution such that an operator is given a broad indication that the process has moved into out-of-process levels. The medium level provides enough resolution such that an operator can diagnose a problem to move the process back to the normal range. A high level of resolution is not needed as an operator is not trying to control the process in the extended range. The abnormal range pressures from 36 psi (~248.2 kPa) to 1,000 psi (~6.89 MPa) corresponds to the last 12.5% of the loop current $I_L$ scale. The abnormal range is provided with low resolution that provides a window to the entire process operating range such that an operator is never without an indication of what the process is doing. In the abnormal range, precise data is not as useful as merely knowing that the process has gone to levels where action needs to be taken.

Thus, transmitter 12 provides workstation 22 with a tri-linear analog output signal having three slopes. As described above, the inflection points between the slopes of the normal range, extended range and abnormal range are programmed into circuitry 72. The inflection points can be based on cutoff pressure levels, as described above, or cutoff current levels. In one embodiment, transmitter circuitry 72 can be programmed to trigger the change in slope at a predetermined current level. Thus, in the embodiment of FIG. 3C, circuitry 72 triggers a switch in the slope of the output signal when output interface 70 produces a 16 mA signal, knowing that that current level corresponds to a sensed pressure above 9 psi (~62.1 kPa). At such time, circuitry 72 may also switch which sensor output is used, such as when transitioning between the normal range and the extended range, such as described above. However, the inflection points may be chosen at points within the output of a single sensor, such as when transitioning between the extended range and the abnormal range as described in the embodiments above.

Scalable rangeability can be applied to other multiple variable sensor systems. For example, scalable rangeability can be used in absolute pressure transmitters having a strain gage pressure sensor for sensing in the range of 0-30 psi (206.8 kPa), and a capacitive sensor for sensing in the range of 0-5,000 psi (~34.5 MPa) to provide an extended range output. In other embodiments, scalable rangeability may also be used in transmitters that sense only a single process parameter, such as absolute pressure, gauge pressure, temperature, flow, level and multi-variable transmitters, as described with reference to FIGS. 6 and 7.

Figure 6:
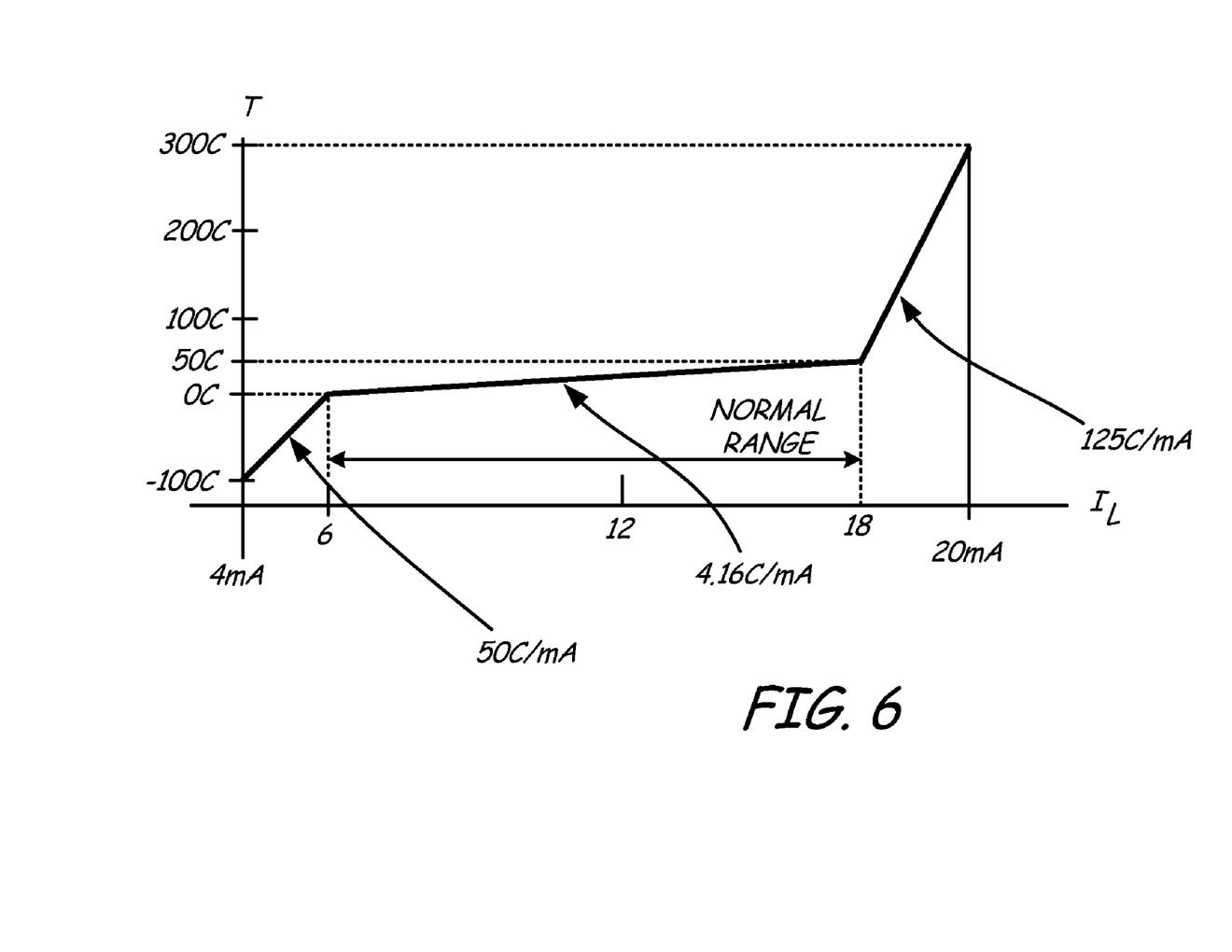
FIG. 6 shows a graph illustrating inflection points between tri-linearly distributed process condition ranges for a single sensor temperature transmitter.

FIG. 6 shows a graph illustrating inflection points between linearly distributed process condition ranges for a single sensor temperature transmitter. In the described embodiment, the temperature sensor has a full sensor range of about −100° C. to about +300° C. However, operation of the process that the sensor monitors has a normal range of about 0° C. to about 50° C. However, the process temperatures may occasionally extend into lower or higher temperatures, such as if extended process conditions occur or abnormal system events occur. Thus, extended ranges of various sizes are provided at either end of the normal range to provide a tri-linear output signal. The temperature data for each range is provided by a single temperature sensor, but the data is distributed unequally along the analog communication signal scale. As such, a high degree of resolution is provided for the normal range where accurate information is desirable. A lower degree of resolution is provided outside the normal range conditions such that an operator can monitor the process under all conditions. The number and position of inflection points, where the resolution changes, can be chosen by an operator and programmed into the transmitter circuitry. Likewise, the control room electronics is programmed to decipher the chosen process-variable-to-analog-control-signal distribution.

Figure 7A:
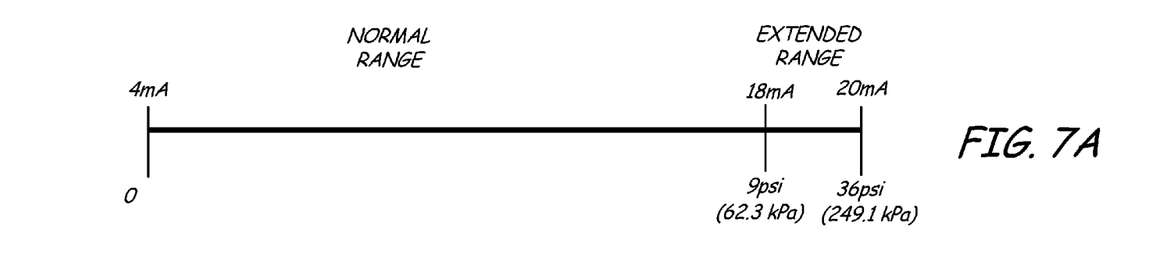
FIG. 7A shows a chart illustrating a bi-linear inflection point for a single sensor pressure transmitter.
Figure 7B:
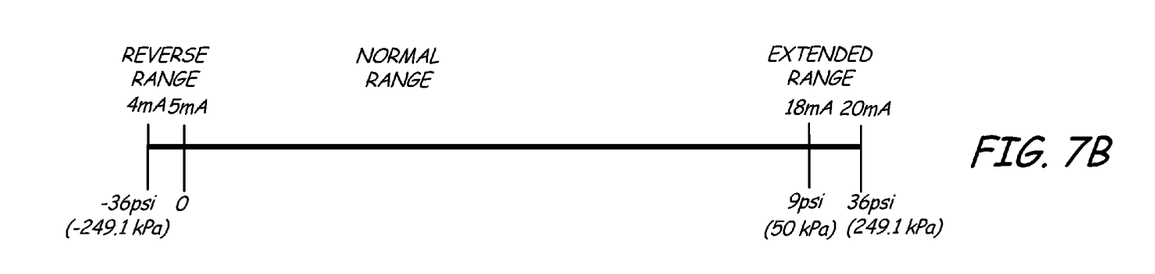
FIG. 7B shows a chart illustrating tri-linear inflection points for a single sensor pressure transmitter including a reverse range.
Figure 7C:
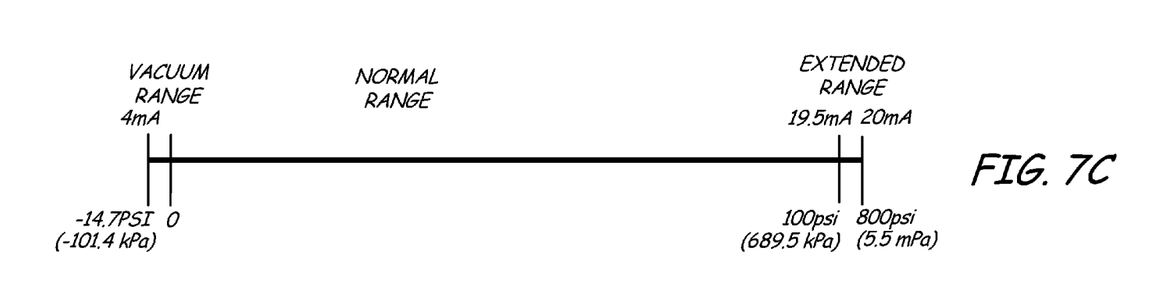
FIG. 7C shows a chart illustrating tri-linear inflection points for a single sensor pressure transmitter including a vacuum range.

FIGS. 7A, 7B, and 7C show charts illustrating inflection points between linearly distributed process condition ranges for a single sensor pressure transmitter. In the example of FIG. 7A, the device is a differential pressure transmitter with an upper range limit of 36 psi (~248.2 kPa). The normal range is 0 to 9 psi (~62.1 kPa) but the device is capable of measuring flow up to the upper range limit of the sensor, 36 psi (~248.2 kPa). In this case 14 mA of the analog range, from 4 mA to 18 mA, is used for the normal range of 0 to 9 psi (~62.1 kPa) and 2 mA of the analog range, from 18 mA to 20 mA, is used for the extended range of 9 psi (~62.1 kPa) to 36 psi (~248.2 kPa).

In the example of FIG. 7B, the device is a differential pressure transmitter with an upper range limit of 36 psi (~248.2 kPa). In this example, 1 mA of the analog range, from 4 mA to 5 mA, is used to measure reverse flow from −36 psi (~−248.2 kPa) to 0 psi. The next 14 mA of the analog range, from 5 mA to 19 mA, is used for the normal flow from 0 to 7.2 psi (~50 kPa). The last 1 mA of the analog range, from 19 mA to 20 mA, is used for the extended range of 7.2 (~50 kPa) to 36 psi (~248.2 kPa).

In the example of FIG. 7C, the device is a gauge pressure transmitter with an upper range limit of 800 psi (~5.5 MPa). In this example 0.5 mA of the analog range, from 4 mA to 4.5 mA, is used to measure vacuum pressures from −14.7 psi (~−101.4 kPa) to 0 psi. The next 15 mA of the analog range, from 4.5 mA to 19.5 mA, is used for the normal pressure range of 0 to 100 psi (689.5 kPa). The last 0.5 mA of the analog range, from 19.5 mA to 20 mA, is used for the extended pressure range of 100 psi (689.5 kPa) to 800 psi (~5.5 MPa).

The present invention provides a simple solution for obtaining increased amounts of data from process transmitters using analog control loops. Process transmitters can be provided with hardware and programmed with software that performs scalable rangeability algorithms to obtain sensor data at higher resolutions. Only a small amount of resolution is sacrificed at normal ranges for the ability to obtain data into extended ranges. The present invention permits a great deal of flexibility in determining the number of linear relationships and inflection points to use. Existing control systems can readily use scalable rangeability, as control systems are already set up to operate using analog control loops such as 4 mA to 20 mA systems. Scalable rangeability is easier to understand than other potential solutions. For example, complicated number manipulation is avoided, as all output is still represented in a linear relationship. Also, the whole pressure sensor range is still presented as a single continuum of data. The invention can be provided as an add-on or upgrade to existing transmitters.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An industrial process transmitter comprising:
   a sensing system for sensing a process variable over a range; and
   transmitter electronics connected to the sensing system and configured to produce an analog communication signal representative of the process variable over a scale;
   wherein the range is disproportionately distributed over the scale by the transmitter electronics to communicate the process variable over an analog control loop.

2. The industrial process transmitter of claim 1 wherein the transmitter electronics includes a controller that multi-linearly distributes the range over the scale with different slopes.

3. The industrial process transmitter of claim 1 wherein the disproportionately distributed range includes an inflection point between a first linear distribution and a second linear distribution.

4. The industrial process transmitter of claim 3 wherein the first linear distribution has a different slope than the second linear distribution.

5. The industrial process transmitter of claim 3 wherein the analog communication signal has different resolution at the first linear distribution than the second linear distribution.

6. The industrial process transmitter of claim 3 wherein the first linear distribution is distributed over a different proportion of a 4 mA to 20 mA scale than the second linear distribution.

7. The industrial process transmitter of claim 3 wherein the sensing system comprises:
   a first sensor apparatus; and
   a second sensor apparatus.

8. The industrial process transmitter of claim 7 wherein:
   the first sensor apparatus comprises a differential pressure cell; and
   the second sensor apparatus comprises a pair of absolute pressure sensors.

9. The industrial process transmitter of claim 7 wherein an output based upon the process variable as sensed by the first sensor apparatus is distributed over the first linear distribution and an output based upon the process variable as sensed by the second sensor apparatus is distributed over the second linear distribution.

10. The industrial process transmitter of claim 3 wherein the first inflection point is located at an extended process condition point in the range.

11. The industrial process transmitter of claim 10 wherein the range further comprises:
    a second inflection point; and
    a third linear distribution.

12. The industrial process transmitter of claim 11 wherein the second inflection point is located at an abnormal process condition point in the range.

13. A method for transmitting sensor data as a scaled analog output signal, the method comprising:
    sensing a process variable with a sensor system having a sensor range encompassing a normal process range and an extended process range;
    unevenly distributing the normal process range and the extended process range over an analog communication signal scale;
    transmitting sensor data relating to the normal process range over an analog communication loop at a first resolution; and
    transmitting sensor data relating to the extended process range over the analog communication loop at a second resolution.

14. The method of claim 13 wherein the step of unevenly distributing the normal process range and the extended range comprises:
    establishing a first linear relationship between the normal process range and a first segment of the analog communication signal scale; and
    establishing a second linear relationship between the extended range and a second segment of the analog communication signal scale.

15. The method of claim 14 wherein the step of sensing the process variable with a sensor system comprises:
    sensing the process variable in the normal process range with a first sensor apparatus; and
    sensing the process variable in the extended process range with a second sensor apparatus.

16. The method of claim 14 wherein the analog communication signal scale comprises a 4 mA to 20 mA current and the first segment is distributed over a larger portion of the 4 mA to 20 mA current than the second segment.

17. The method of claim 13 wherein the sensor system has a sensor range encompassing an abnormal range.

18. An industrial process transmitter configured to sense a process variable over a process operating range including a normal process range and an extended process range, the transmitter comprising:
    a sensing system that senses a process variable over a sensor range and that produces a sensor signal that is a function of the process variable over the process operating range;
    transmitter electronics connected to the sensing system and configured to produce a scaled analog communication signal based upon the sensor signal, the transmitter electronics including a controller that non-linearly distributes the sensor signal over the scale to communicate process variable data.

19. The industrial process transmitter of claim 18 wherein the controller establishes a first linear relationship between the normal operating range and a first segment of the scaled analog communication signal, and a second linear relationship between the extended operating range and a second segment of the scaled analog communication signal, the first segment encompassing a larger portion of the analog communication signal than the second segment.

20. The industrial process transmitter of claim 18 and further comprising:
    circuitry located at a control room remote from the transmitter for converting the scaled analog communication signal into a process variable value.

* * * * *